3,775,366
PROCESS FOR CROSS-LINKING OF NATURAL AND SYNTHETIC RUBBER CONTAINING FILLERS
Siegfried Wolff, Bruhl Bezirk Cologne, Hermann Westlinning, Kleinostheim, Werner Schwarze, Frankfurt am Main, and Werner Sroka, Bruhl Bezirk Cologne, Germany, assignors to Deutsche Gold- und Silber-Scheideanstalt vormals Roessler, Frankfurt am Main, Germany
No Drawing. Filed June 16, 1971, Ser. No. 153,472
Int. Cl. C08c 11/10, 11/18, 11/60
U.S. Cl. 260—41.5 R                                    20 Claims

ABSTRACT OF THE DISCLOSURE

Natural and synthetic rubbers containing a filler are cross linked with triazines of the formulae

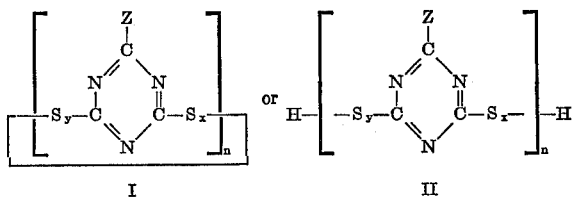

where $n$ is 3 to 20, $x$ and $y$ are 1 to 4, Z is phenyl, alkylphenyl, alkoxy, alkylthio,

where $R_2$ and $R_3$ are hydrogen, alkyl, benzyl or cycloalkyl or together with the nitrogen form a ring having 5 to 8 atoms with up to one further nitrogen or oxygen atom.

---

The invention is directed to a process of cross-linking (vulcanizing) natural or synthetic rubber containing fillers or mixtures containing these materials without the use of elemental sulfur with vulcanization aids under heat and possibly pressure which under use of the new kinds of cross-linking causing materials offer considerable industrial advantages in regard to the workability of the mixtures in the plastic state and which, impart good properties to products produced in this manner.

As the synthetic rubbers there are used polyolefin polymers such as homopolymers of butadiene or isoprene or copolymers of such diolefins with other ethylenically unsaturated monomers, e.g. rubbery butadiene-styrene copolymer, rubbery butadiene-acrylonitrile copolymer, ethylene-propylene terpolymers.

At present to cross link rubber cross linking systems are generally employed which either lead to —C—C—, —C—S—C— or —C—S$_x$—C (where $x$ is an integer) cross connection or cross linking bridges. According to the length of the cross linking bridges the properties of the vulcanizate can be varied in a more or less narrow frame. Proceeding on a rule of thumb the test values of the deformation behavior of the vulcanizate are only dependent upon the number of places of cross linking while the test values of the preponderantly dynamic investigations depend upon the chemical constitution of the cross-linking bridges and naturally also upon their number.

The customary vulcanization systems today which are used in the production of products for preponderantly dynamic requirements produce polysulfide cross linking bridges with a variable number of sulfur atoms in the sulfur chain. The number of sulfur atoms of a cross-linking bridge can only be varied to a small extent by change of the proportions of sulfur to accelerator. On the contrary it is not possible to aim at producing a definite chain length.

Although the vulcanization with sulfur in industry has outstanding significance it is not without disadvantages. Especially the phenomenon known as reversion is especially undesired in the pertinent industry since it leads to a loss of cross-linking yield. In order to avoid the disadvantages of sulfur vulcanization, processes have been developed which lead to cross-linking bridges of other chemical structure and length. For this purpose, for example, there have been used peroxides, bis-azo compounds or boranes as cross linkers. However, until now none of these processes have attained great industrial significance.

In all of these previously used cross-linking agents there is found for each specific polymer a constant incubation time and velocity constant for the cross-linking reaction. This means that the kinetics of the cross-linking reaction cannot be influenced. This constancy causes limitations in regard to the use of these compounds.

The invention is directed to the problem of finding a process for the cross-linking of natural or synthetic rubber (of the type disclosed above) containing fillers or mixtures containing these materials without the use of elemental sulfur with sulfur containing triazine compounds as the cross-linking agent using heat and pressure if necessary, by which the kinetics of the cross-liking reaction can be changed within a wide range. The temperature of cross-linking with the compounds of the invention can be 120 to 250° C. and the pressure 1 to 400 atmospheres.

According to the invention there is used as the cross-linking agent closed or open chain substituted 1,3,5-triazine compounds of the general formulae,

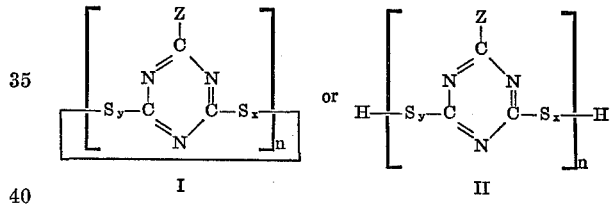

or mixtures thereof, wherein $n$ has a value of about 3 to about 20, $x$ and $y$ each have a value of 1 to 4 or preferably 1 to 2 and Z is phenyl or, in a given case, phenyl substituted with one or two alkyl groups containing 1 to 5 carbon atoms or is one of the groups $R_1O$—, $R_1$—S— or

where $R_1$ is a straight or branched chain alkyl group of 1 to 18 carbon atoms, $R_2$ and $R_3$ are the same or different and are as defined for $R_1$ or are benzyl or a cycloalkyl group of 5 to 8 carbon atoms, or hydrogen or together with the nitrogen form a ring having a total of 5 to 8 ring atoms which besides the —CH$_2$— groups and the nitrogen atom in a given case can contain a further heterocyclic oxygen or nitrogen atom, or NH or NR$_1$. The heterocyclic ring can be substituted with one or two alkyl groups of 1 to 4 carbon atoms.

Compounds of Formulae I or II on the one hand by the variation of the substituents Z and on the other hand by changing $x$ and/or $y$ permit an aimed adaptation of the cross-linking system according to the working conditions of the rubber mixtures as well as according to the apparatus required for their production.

By the inclusion of the triazine compounds of the invention as cross-linking agent cross-linking bridges of a new type of chemical structure are built into the rubber molecule. By variation of Z, $x$ and $y$ the kinetics of the cross-linking reaction can be varied within a wide range. Especially a lengthening of the sulfur chain between the triazine residues that means an increasing of x and/or y in the General Formulae I or II results in higher yields of cross-linking and higher velocity constants for the cross-linking reaction.

By the introduction of cross-linking bridges which are very different in their chemical constitution from the usual sulfur chain changed properties are also imparted to the vulcanizates. The cause of these changed properties is in part due to the fact that by the introduction of polar cross-linking groups new interacting forces become effective in the vulcanizates.

The value for $n$ in the triazine compounds of General Formulae I and II are ascertained through determination of the molecular weight and by elemental analysis, therefore, the limiting value or average value is found. It is therefore justified to stress the approximate values. For $n$ the required value is between about 3 to about 20, preferably about 4 to 10. The triazine compounds preferably have the open chain structure of Formula II. For example, there can be used poly-(2-diethylamino-bis-4,6-thio-s-triazine) having for example a value (statistical) for $n$ of approximately 8, $x$ and $y$ are both 1 (Compound V80). The values for $x$ and $y$ are regulated by the production conditions and by selection of the reaction partners for example by addition of sulfur dichloride, sulfur monochloride or in a given case higher sulfur chlorides as the reaction partner with a dimercaptotriazine.

Examples of such dimercaptotriazines include 2-phenyl-4,6-dimercaptotriazine,
2-(2'-methyl)phenyl-4,6-dimercaptotriazine,
2-(3'-butyl)phenyl-4,6-dimercaptotriazine,
2-(2'-ethyl-4'-isopropyl)phenyl-4,6-dimercaptotriazine,
2-(4'-amyl)phenyl-4,6-dimercaptotriazine,
2-(2'-methyl-4'-t-amyl)phenyl-4,6-dimercaptotriazine,
2-methoxy-4,6-dimercaptotriazine,
2-octylthio-4,6-dimercaptotriazine,
2-butoxy-4,6-dimercaptotriazine,
2-sec-amyloxy-4,6-dimercaptotriazine,
2-isopropoxy-4,6-dimercaptotriazine,
2-methylthio-4,6-dimercaptotriazine,
2-isopropylthio-4,6-dimercaptotriazine,
2-octadecylthio-4,6-dimercaptotriazine,
2-octadecoxy-4,6-dimercaptotriazine,
2-octoxy-4,6-dimercaptotriazine,
2-amino-4,6-dimercaptotriazine,
2-methylamino-4,6-dimercaptotriazine,
2-dimethylamino-4,6-dimercaptotriazine,
2-methylpropylamino-4,6-dimercaptotriazine,
2-sec-butylamino-4,6-dimercaptotriazine,
2-di-t-amylamino-4,6-dimercaptotriazine,
2-dicyclohexylamine-4,6-dimercaptotriazine,
2-octylamino-4,6-dimercaptotriazine,
2-octadecylamino-4,6-dimercaptotriazine,
2-dioctadecylamino-4,6-dimercaptotriazine,
2-benzylamino-4,6-dimercaptotriazine,
2-dibenzylamino-4,6-dimercaptotriazine,
2-cyclopentylamino-4,6-dimercaptotriazine,
2-dicyclopentylamino-4,6-dimercaptotriazine,
2-cyclooctylamino-4,6-dimercaptotriazine,
2-dicycloheptylamino-4,6-dimercaptotriazine,
2-pyrrolidino-4,6-dimercaptotriazine,
2-piperidino-4,6-dimercaptotriazine,
2-(4'-methyl)piperidino-4,6-dimercaptotriazine,
2-(4'-butyl)piperidino-4,6-dimercaptotriazine,
2-(3'-ethyl-5'-propyl)piperidino-4,6-dimercaptotriazine,
2-morpholino-4,6-dimercaptotriazine,
2-piperazino-4,6-dimercaptotriazine,
2-(4'-methyl)piperazino-4,6-dimercaptotriazine,
2-(4'-decyl)piperazino-4,6-dimercaptotriazine.

With any of the starting triazines set forth above the triazine compounds which are derivatives thereof and employed in the invention can have $x$ and $y$ both being 1 and $n$ being approximately 3, 4, 8, 10, 12 or 20 for example or $x$ and $y$ both being 2 and $n$ being approximately 3, 4, 6, 10, 14 or 20 for example, or $x$ being 1 and $y$ being 2 and $n$ being approximately 3, 4, 6, 10, 12 or 20 for example, or $x$ and $y$ both being 4 and $n$ being approximately 3, 4, 8 or 20 for example. Other triazine compounds used in the invention will be set forth hereinafter. The methods of preparing such triazine compounds also set forth hereinafter are useful to prepare any of the compounds within the invention.

Emphasized as the most important substituents for Z in General Formulae I and II are—beside the oxygen and sulfur containing derivatives $R_1O$— or $R_2S$— with aliphatic (alkyl) residues for $R_1$ beginning with methyl, ethyl, propyl, isopropyl groups and so forth, on practical or industrial grounds preferably lower alkyl groups with up to 8 carbon atoms to up to 18 carbon atoms containing alkyl groups—the nitrogen containing derivatives with chiefly an amino group structure, under which, however, nitrogen ring structures, such as for example the morpholino or the pyrrolidino group, are included, as is subsequently illustrated.

For the nitrogen substituents (for Z) for $R_2$ and $R_3$ there is the same meaning or limits as for $R_1$ with the further inclusion of benzyl, cycloalkyl of 5 to 8 carbon atoms, as well as such groups which with the named nitrogen atoms are closed to form a ring, in a given case substituted with one or two branched or straight chain alkyl groups of 1 to 4 carbon atoms to form morpholine, piperidine or pyrrolidine rings or similar known heterocyclic rings containing a total of 5 to 8 ring atoms which besides the —$CH_2$— groups and the nitrogen atoms in a given case can contain a still further heterocyclic oxygen or nitrogen atom. $R_2$ and $R_3$ also can be hydrogen.

The use of sulfur containing aminotriazines or triazine derivatives in rubber vulcanization, always together with sulfur is known. It is a matter of, for example, bis alkylamino mercapto-s-triazine or oligomer compounds of these triazines which possess in each triazine ring only mercapto sulfur atom and act in common with sulfur and in mixtures with reinforcing rubber fillers as effective agents for the improvement of the rubber-filler interaction.

It is further known to use such oligomer s-triazine compounds which possess per 1,3,5-triazine molecule two sulfidic sulfur atoms in the 4 and 6-position for the vulcanization with sulfur of reinforcing filler containing rubber or double bond possessing rubber like elastomers. Together with sulfur these s-triazine compounds effect a vulcanization, which vulcanization characteristics can be influenced to a large extent, namely not as formerly by changes of concentration—with all the qualified results thereby—but by selection of s-triazine derivatives with various substituents.

In contrast to these s-triazine accelerators the cross-linking agents recommended in the invention first have the substantial advantage that they can be added without the concurrent use of elemental sulfur, which are also surprisingly, in many ways, superior to the named s-triazine accelerators as well as the known monomeric triazine derivatives already known as cross-linking agents, especially when the sum of $x$ and $y$ is greater than two, especially 3 or 4. These 1,3,5-triazine compounds which can be characterized as polydi-, polytri-, polytetrasulfides and so forth, have, as has been unexpectedly found, extremely valuable properties in their addition as cross-linking agents without the use of elemental sulfur in the vulcanization of natural or synthetic rubbers or mixtures containing such polymers, especially in the presence of fillers for rubber, advantageously reinforcing rubber fillers.

Especially valuable properties of the new cross-linking agents are the following. With increasing number of sulfidic sulfur atoms in the cross linker molecule the velocity constant of the cross-linking reaction increases, for example from cross linker V80 to cross linker V500 (see Table I) from $9 \times 10^3$ [min.$^{-1}$] to $38 \times 10^3$ [min.$^{-1}$]. Likewise the cross-linking yield is increased, for example about 50%, if in place of cross-linking agent V80 there is mixed in agent V500. Likewise the incubation time for the cross-linking reaction is definitely shortened, to be sure by use of both named cross-linking agents in the same sequence as above to about 200 seconds.

It is especially surprising that by addition of elemental sulfur to the polydisulfides in the amount which corresponds to the increased sulfur content of the polytri- or polytetrasulfides, although the cross-linking yield and the velocity constant are somewhat increased and the incubation time lower, the respective values of the mixtures with the polytri- or polytetrasulfides of the s-triazine derivatives are not nearly reached.

Further important advantages of the new cross-linking agents will be observed from the following examples.

In addition to natural types rubber the process of the present invention is suitable for cross-linking rubbery olefines, particularly polyolefin polymers or copolymers, e.g. homo polymers of butadiene, isoprene, butadiene-styrene copolymer, butadiene-acrylonitrile copolymer, butadiene acrylic acid ester copolymers, e.g. butadiene-2-ethylhexyl acrylate copolymer, butadiene-methyl methacrylate copolymer, butadiene-vinylpyridine copolymer, butadiene-alkylvinylpyridine copolymer, e.g. butadiene-2-vinyl-5-methylpyridine copolymer. The butadiene vinylpyridine or alkylvinylpyridine copolymers in a given case are used in admixture with resorcinolformaldehyde resins. There can also be employed other vulcanizable elastomers such as ethylene-propylene copolymers or ethylene-propylene terpolymers, e.g., ethylene-propylene-dicyclopentadiene, ethylene-propylene-norbornadiene, ethylene-propylene-cyclooctadiene, ethylene - propylene-cyclododecatriene.

As fillers all kinds of blacks can be used which are added in rubber technology, e.g. channel blacks and furnace blacks, as well as silica, which has been obtained by precipitation aqueous pyrogenic produced silica and arc silica, furthermore silicates, e.g. calcium silicates, as well as in a given case alumina, carbonates e.g. calcium carbonate, chalk, kaolin and other clays and kieselguhr. The fillers are used in their customary proportions, e.g. 10 to about 200 parts per 100 parts of rubber.

Unless otherwise indicated all parts and percentages are by weight.

In the following examples properties of mixtures and vulcanizates produced with the crosslinking agents of General Formulae I or II were examined from which individually the effect of the compounds can be seen whereby their advantages become apparent.

Appropriately the cross-linking agents of the invention are used in an amount of 0.1 to 10 grams, preferably 0.5 to 4 grams per 100 grams of rubber.

The cross-linking agents were produced by the following processes:

(a) Poly(2-diethylamino-bis-4,6-thiotriazine) (V80)

54.1 grams (0.250 mole) of 2 - diethylamino-4,6-dimercaptotriazine were suspended in 300 ml. of methanol and 34.1 grams (0.300 mole) of hydrogenperoxide (30%) slowly added dropwise while the temperature was so regulated with a water bath that it did not exceed 50° C. It was allowed to react for 30 minutes at 50° C. The suspension was filtered off and washed with methanol. The drying took place in vacuo at 50° C. over $CaCl_2$.

Yield: 99% of theory
Melting Point: 230° C.

(b) Poly(2-diethylamino-4-thio-6-dithio-triazine (V531)

100 grams (0.462 mole) of 2-diethylamino-4,6-dimercaptotriazine were suspended in 400 ml. of tetrahydrofurane and 47.6 grams (0.462 mole) of sulfur dichloride slowly added dropwise while the temperature was so regulated with a water bath that it did not exceed 40° C. It was allowed to react for 30 minutes at 40° C. and the solution was then added dropwise into 2 liters of methanol. The precipitate was filtered off and washed until neutral with methanol. The drying took place in vacuo at 40° C. over $CaCl_2$.

Yield: 91% of theory
Melting Point: 140° C.

(c) Poly(2-diethylamino-bis-4,6-dithiotriazine) (V500)

100 grams (0.462 mole) of 2 - diethylamino - 4,6-dimercaptotriazine were suspended in 400 ml. of tetrahydrofurane and 62.4 grams (0.462 mole) of disulfur dichloride slowly added dropwise while the temperature was so regulated with a water bath that it did not exceed 40° C. It was allowed to react for 30 minutes at 40° C. and the reaction product added to 2 liters of methanol. The precipitate was filtered off and washed until neutral with methanol. The drying took place in vacuo at 40° C. over $CaCl_2$.

Yield: 84% of theory
Melting Point: 145° C. (softening)

(d) Poly(2-N-methyl-cyclohexylamino-bis-4,6-thiotriazine) (V512)

100 grams (0.390 mole) of 2-N-methyl-cyclohexylamino - 4,6 - dimercaptotriazine were suspended in 600 ml. of methanol and 48.6 grams (0.429 mole) of hydrogen peroxide (30%) slowly added dropwise while the temperature was so regulated with a water bath that it did not exceed 50° C. It was allowed to react for 30 minutes at 50° C. The suspension was filtered off and washed with methanol. The drying took place in vacuo at 50° C. over $CaCl_2$.

Yield: 97% of theory
Melting Point: 220° C.

(e) Poly(2-N-methyl-cyclohexylamino-4-thio-6-dithio-triazine) (V522)

60 grams (0.234 mole) of 2-N-methyl-cyclohexylamino-4,6 - dimercaptotriazine were dissolved in 350 ml. of tetrahydrofurane and 24.1 grams (0.234 mole) of sulfur dichloride slowly added dropwise while the temperature was so regulated with a water bath that it did not exceed 40° C. It was allowed to react for 30 minutes at 40° C. and the solution was then added dropwise into 1 liter of methanol. The precipitate was filtered off and and washed until neutral with methanol. The drying took place in vacuo at 40° C. over $CaCl_2$.

Yield: 87% of theory
Melting Point: Softening from 188° C.

(f) Poly(2-N-methyl-cyclohexylamino-bis-4,6-dithiotriazine) (V502)

60 grams (0.234 mole) of 2-N-methyl-cyclohexylamino-4,6 - dimercaptotriazine were dissolved in 350 ml. of tetrahydrofurane and 31.6 grams (0.234 mole) of disulfur dichloride slowly added dropwise while the temperature was so regulated with a water bath that it did not exceed 40° C. It was allowed to react for 30 minutes at 40° C. and the solution was then added dropwise into 1 liter of methanol. The precipitate was filtered off and washed until neutral with methanol. The drying took place in vacuo at 40° C. over $CaCl_2$.

Yield: 88% of theory
Melting Point: Softening from 180° C.

(g) Poly(2-hexamethylenimino-bis-4,6-thio-triazine) (V511)

100 grams (0.412 mole) of 2-hexamethylenimino-4,6-dimercaptotriazine were suspended in 600 ml. of methanol and 51.4 grams (0.453 mole) of hydrogenperoxide (30%) slowly added dropwise while the temperature was so regulated with a water bath that it did not exceed 50° C. It was allowed to react for 30 minutes at 50° C.

The suspension was filtered off and washed with methanol. The drying took place in vacuo at 50° C. over CaCl$_2$.

Yield: 99% of theory
Melting Point: 190° C.

(h) Poly(2-hexamethylenimino-4-thio-6-dithio-triazine) (V521)

75 grams (0.309 mole) of 2-hexamethylenimino-4,6-dimercaptotriazine were suspended in 600 ml. of tetrahydrofurane and 31.9 grams (0.309 mole) of sulfur dichloride slowly added dropwise while the temperature was so regulated with a water bath that it did not exceed 40° C. It was allowed to react for 30 minutes at 40° C. and the solution was then added dropwise into 2 liters of methanol. The precipitate was filtered off and washed until neutral with methanol. The drying took place in vacuo at 40° C.

Yield: 55% of theory
Melting Point: 124° C.

(i) Poly(2-hexamethylenimino-bis-4,6-dithio-triazine) (V501)

75 grams (0.309 mole) of 2-hexamethylenimino-4,6-dimercaptotriazine were suspended in 600 ml. of tetrahydrofurane and 41.7 grams (0.309 mole) of disulfur dichloride slowly added dropwise while the temperature was so regulated with a water bath that it did not exceed 40° C. It was allowed to react for 30 minutes at 40° C. and the solution was then added dropwise to 2 liters of methanol. The precipitate was filtered off and washed until neutral with methanol. The drying took place in vacuo at 40° C. over CaCl$_2$.

Yield: 91% of theory
Melting Point: 160° C. (softening)

The tests described in the following examples were carried out with the preferred polydi-1 polytri- and polytetrasulfides entered in Table I.

molecular amount of (b) polytrisulfide V522 or (c) polytetrasulfide X502. In thus identified series there was a definite increase in the degree of cross-linking expressed by the difference in the torque figures $D\infty - D_a$ of the cross-linking isothermes, an increase of the velocity constant of the cross-linking reaction $k_v^I$ and a reduction of the incubation time $t_i$.

The measurements were carried out at 155° C. in an oscillation disc rheometer.

TABLE II

Vulcanization of said SBR-mixture with polydi-, polytri- or polytetrasulfide

| Cross-linking agent (amount) | $t_i$ [sec.][1] | $k_v^I \times 10^3$ [min.$^{-1}$][1] | $D\infty - D_a$ [mkp.][1] |
|---|---|---|---|
| V512 (3.0 pphr.) | 1,500 | 14 | 1.290 |
| V522 (3.38 pphr.) | 870 | 28 | 1.676 |
| V502 (3.76 pphr.) | 690 | 48 | 1.778 |

[1] See: German Industrial Standard DIN 53 529 (Entwurf September 1969 and February 1971, Vornorm).

EXAMPLE II

The named changes in vulcanization characteristics also occurred when experiments were carried out under identical conditions with butadiene rubber (BR) or natural rubber (NR). The results of these experiments are set forth in Tables 3 and 4.

TABLE III

Vulcanization of BR mixtures with polydi-, polytri- or polytetrasulfied using 100 grams of rubber

| Cross-linking agent (amount) | $t_i$ [sec.] | $k_v^I \times 10^3$ [min.$^{-1}$] | $D\infty - D_a$ [mkp.] |
|---|---|---|---|
| V512 (3.0 pphr.) | 2,862 | 16 | 0.914 |
| V522 (338 pphr.) | 720 | 16 | 1.428 |
| V502 (3.76 pphr.) | 420 | 28 | 1.755 |

TABLE I

| Compound | Z | x | y | n | Name |
|---|---|---|---|---|---|
| V80 |  | 1 | 1 | 8 | Poly(2-diethylamino-bis 4,6-thio-s-trizaine). |
| V531 | Same as above | 2 | 1 | 6.1 | Poly(2-diethylamino-4-thio-6-dithio-triazine). |
| V500 | do | 2 | 2 | 10.5 | Poly(2-diethylamino-bis-4,6-dithio-trizaine.) |
| V512 | 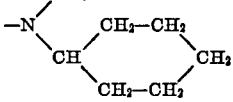 | 1 | 1 | 4.7 | Poly(2-N-methylcyclohexylamino-bis-4,6-thio-trizine). |
| V522 | Same as above | 2 | 1 | 7.3 | Poly(2-N-methylcyclohexylamino-4-thio-6-dithio-triazine). |
| V502 | do | 2 | 2 | 14.1 | Poly(2-N-methylcyclohexylamino-bis-4,6-dithio-triazine). |
| V511 | 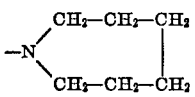 | 1 | 1 | ~8.3 | Poly(2-hexamethylenimino-bis-4,6-thio-triazine). |
| V521 | Same as above | 2 | 1 | ~12.2 | Poly(2-hexamethylenimino-4-thio-6-dithio-triazine). |
| V501 | do | 2 | 2 | ~11.7 | Poly(2-hexamethylenimino-bis-4,6-dithio-triazine). |

The values given above in Table I for $n$ were calculated from the molecular weight and the molecular weight itself was determined by gel chromatography using a column filled with Sephadex LH20. The gel chromatography determination showed that the cross-linking agents with greater certainty are linear polymers.

EXAMPLE I

There were compared the vulcanization properties of butadiene-styrene rubber (SBR) mixtures containing 100 parts of the rubber, 40 parts of HAF carbon black, 3 parts of ZnO, 2 parts of stearic acid and (a) 3 parts of polydisulfide V512, or (b) in place of V512 an equi-

TABLE IV

Vulcanization of natural rubber mixtures with polydi-, polytri- or polytetrasulfide

| Cross-linking agent (amount) | $t_i$ [sec.] | $k_v^I \times 10^3$ [min.$^{-1}$] | $D\infty - D_a$ [mkp.] |
|---|---|---|---|
| V512 (3.0 pphr.) | 1,803 | 32 | 0.252 |
| V522 (3.38 pphr.) | 942 | 90 | 0.276 |
| V502 (3.76 pphr.) | 301 | 105 | 0.520 |

EXAMPLE III

If there are used as the cross-linking agents triazine derivatives in which in contrast to the cross-linking agents named in Examples 1 and 2 the substituent Z of the General Formulae I or II is changed then again in SBR, BR and NR there is an increase in the cross-linking yield, an increase of the velocity constant of the cross-linking reaction and a reduction of the incubation time in the sequence polydi-, polytri-, polytetrasulfide.

The following Tables V, VI and VII show the results of vulcametric experiments which were measured in mixtures with SBR, BR and NR using as cross-linking agents V511, V521 and V501 (see Table I). Otherwise, the compositions and vulcanization conditions are the same as in Example I.

TABLE V
Vulcanization of SBR mixtures with cross-linking agents V511, V521 and V501.

| Cross-linking agent (amount) | $t_i$ [sec.] | $k_v^1 \times 10^3$ [min.$^{-1}$] | $D_\infty - D_a$ [mkp.] |
|---|---|---|---|
| V511 (3.0 pphr.) | 1,944 | 10 | 1.119 |
| V521 (3.38 pphr.) | 396 | 48 | 1.774 |
| V501 (3.76 pphr.) | 390 | 74 | 2.046 |

TABLE VI
Vulcanization of BR mixtures with the cross-linking agents V511, V521 and V501

| Cross-linking agent (amount) | $t_i$ [sec.] | $k_v^1 \times 10^3$ [min.$^{-1}$] | $D_\infty - D_a$ [mkp.] |
|---|---|---|---|
| V511 (3.0 pphr.) | 3,060 | 10 | 0.719 |
| V521 (3.38 pphr.) | 492 | 47 | 1.848 |
| V501 (3.76 pphr.) | 378 | 79 | 1.929 |

TABLE VII
Vulcanization of NR (natural rubber) mixtures with cross-linking agents V511, V521 and V501

| Cross-linking agent (amount) | $t_i$ [sec.] | $k_v^1 \times 10^3$ [min.$^{-1}$] | $D_\infty - D_a$ [mkp.] |
|---|---|---|---|
| V511 (3.0 pphr.) | 2,568 | 25 | 0.114 |
| V521 (3.38 pphr.) | 579 | 146 | 0.457 |
| V501 (3.76 pphr.) | 469 | 325 | 0.696 |

EXAMPLE IV

Besides the possibility of influencing the vulcanization characteristics aimed at by use of the named cross-linking agents there is a further advantage in the possibility of using higher vulcanization temperatures than are now employed. While conventional sulfur containing mixtures at higher temperatures always exhibit reversion which is expressed in a decrease of the stress value and the tensile strength, the tensile strength at increases in temperature are changed very little in the sulfur free cross-linking with the s-triazine derivatives according to the present invention, while the stress value $\sigma 300$ increased.

An SBR mixture which contained 100 parts of the rubber, 40 parts of HAF carbon black, 2 parts of stearic acid, 3 parts of ZnO and 4 parts of polydisulfide V80 was cross-linked at increasing vulcanization temperatures (A). For comparison an identical mixture with relation to the polymer, ZnO and stearic acid employed which, however, was vulcanized with 1.0 part of CBS (N-cyclohexyl-2-benzothiazyl-sulfenamide) and 2 parts of sulfur, is referred to as (B). The results of this comparison are set forth in the following table. The time of heating was 100 minutes.

TABLE VIII

| | Tensile strength in kg./cm.² | | Stress value $\sigma$ 300 in kg./cm.² | |
|---|---|---|---|---|
| | A | B | A | B |
| Vulcanization temperature, °C.: | | | | |
| 150 | 222 | 209 | 98 | 134 |
| 160 | 220 | 236 | 129 | 125 |
| 170 | 216 | 169 | 140 | 114 |
| 180 | 196 | 137 | 144 | 112 |

What is claimed is:

1. An elemental sulfur free composition containing a mixture of a vulcanizable rubber selected from the group consisting of a diolefin polymer and, as a cross-linking agent therefor a compound having one of the formulae:

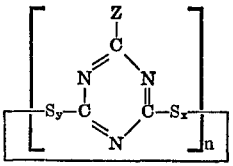 or 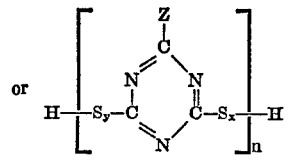

where $n$ is a number between 3 and 20, $x$ and $y$ have a value from 1 to 4 and Z is phenyl, mono or dialkyl phenyl having 1 to 5 carbon atoms in the alkyl group, $R_1$—O—, $R_1$—S— or 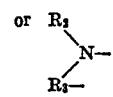

where $R_1$ is alkyl of 1 to 18 carbon atoms, $R_2$ and $R_3$ are the same or different and are hydrogen, alkyl of 1 to 18 carbon atoms, benzyl, cycloalkyl of 5 to 8 carbon atoms or together with the nitrogen atom form a heterocyclic ring of 5 to 8 carbon atoms which in addition to the $CH_2$ groups and said nitrogen atom contains not over one oxygen atom or an additional nitrogen atom and which heterocyclic ring has attached thereto 0 to 2 alkyl groups of 1 to 4 carbon atoms.

2. A composition according to claim 1 wherein the rubber is natural rubber, butadiene-styrene copolymer, butadiene-acrylonitrile copolymer, polyisoprene or polybutadiene.

3. A composition according to claim 2 wherein the compound has Formula II.

4. A composition according to claim 3 wherein the sum of $x$ and $y$ is 3 to 4.

5. A composition according to claim 3 wherein Z is

6. A composition according to claim 5 wherein $R_2$ is lower alkyl and $R_3$ is cycloalkyl.

7. A composition according to claim 5 wherein $R_2$ and $R_3$ are both lower alkyl.

8. A composition according to claim 5 wherein

is heterocyclic selected from the group consisting of morpholion, piperidino, pyrrolidino and azacycloheptyl.

9. A composition according to claim 1 including a filler.

10. A composition according to claim 9 wherein the filler is carbon black, silica, calcium carbonate, kieselguhr or a silicate.

11. A composition according to claim 9 wherein the compound has Formula II.

12. A composition according to claim 1 wherein the rubber is natural rubber, polybutadiene, polyisoprene, butadiene-styrene copolymer, butadiene - acrylonitrile copolymer, butadiene-acrylic acid ester copolymer, butadiene-methyl methacrylate copolymer, butadiene-vinyl pyridine copolymer, butadiene-alkyl vinyl pyridine copolymer or ethylene-propylene terpolymer.

13. A composition according to claim 1 including a filler which is carbon black, silica, calcium carbonate, kieselguhr or a silicate.

14. A composition containing a mixture of a vulcanizable rubber selected from the group consisting of a diolefin polymer and, as a cross-linking agent therefor a compound having one of the formulae:

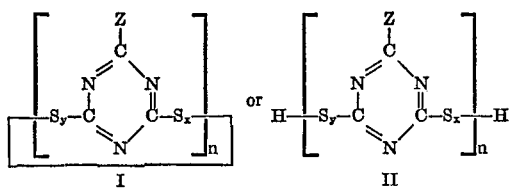

where $n$ is a number between 3 and 20, each of $x$ and $y$ has a value of at least one and the sum of $x$ and $y$ is 3 to 4 and Z is phenyl, mono or dialkyl phenyl having 1 to 5 carbon atoms in the alkyl group, $R_1$—O—, $R_1$—S— or

where $R_1$ is alkyl of 1 to 18 carbon atoms, $R_2$ and $R_3$ are the same or different and are hydrogen, alkyl of 1 to 18 carbon atoms, benzyl, cycloalkyl of 5 to 8 carbon atoms or together with the nitrogen atom form a heterocyclic ring of 5 to 8 carbon atoms which in addition to the $CH_2$ groups and said nitrogen atom contains not over one oxygen atom or an additional nitrogen atom and which heterocyclic ring has attached thereto 0 to 2 alkyl groups of 1 to 4 carbon atoms.

15. A composition according to claim 14 wherein the compound has Formula II.

16. A composition according to claim 14 wherein Z is

17. A composition according to claim 16 wherein $R_2$ is lower alkyl and $R_3$ is cycloalkyl.

18. A composition according to claim 16 wherein $R_2$ and $R_3$ are both lower alkyl.

19. A composition according to claim 16 wherein

is heterocyclic selected from the group consisting of morpholino, piperidino, pyrrolidino and azacycloheptyl.

20. A composition according to claim 14 where the sum of $x$ and $y$ is 4.

References Cited
UNITED STATES PATENTS

| | | | |
|---|---|---|---|
| 3,366,598 | 1/1968 | Westlinning et al. | 260—791 |
| 3,466,258 | 9/1969 | Panek et al. | 260—79.1 X |
| 3,669,936 | 6/1972 | Regenass et al. | 260—79.1 |

FOREIGN PATENTS

| | | |
|---|---|---|
| 1,246,869 | 9/1971 | Great Britain. |

ALLAN LIEBERMAN, Primary Examiner

H. H. FLETCHER, Assistant Examiner

U.S. Cl. X.R.

260—41.5 A, 41.5 MP, 80.7, 82.1, 83.3, 83.5, 85.1, 94.75, 94.7 N, 248 CS, 249.5, 762, 763, 765, 791